May 15, 1928.
W. A. THWEATT
VEHICLE SPRING TOOL
Filed May 7, 1927
1,670,220
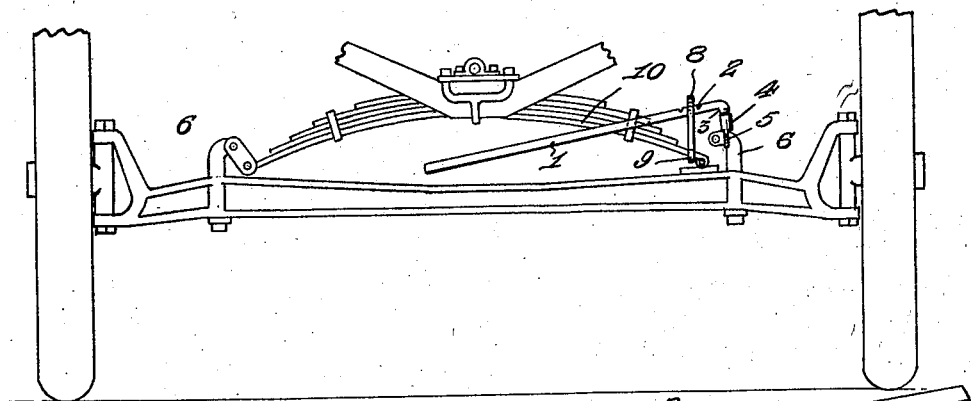
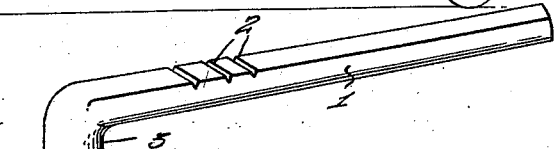
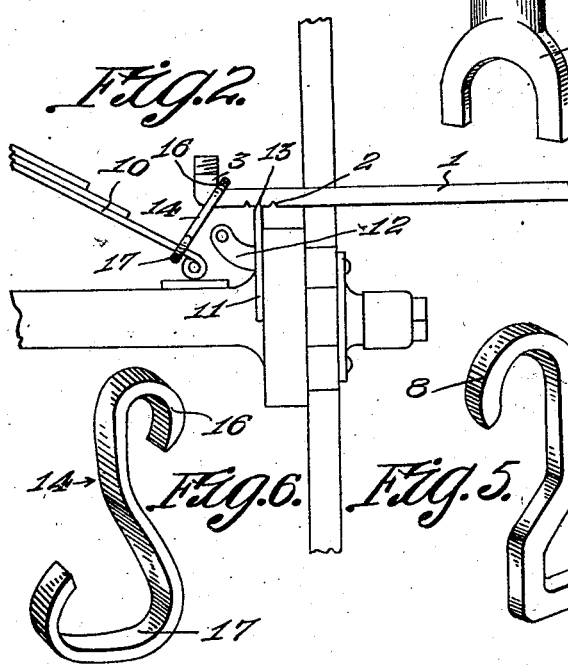
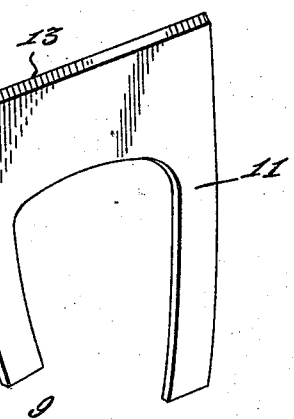
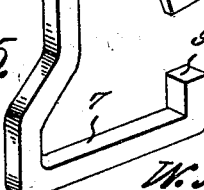
W. A. Thweatt,
INVENTOR
BY Victor J. Evans
ATTORNEY
WITNESS:

Patented May 15, 1928.

1,670,220

UNITED STATES PATENT OFFICE.

WILLIAM A. THWEATT, OF PADUCAH, KENTUCKY.

VEHICLE SPRING TOOL.

Application filed May 7, 1927. Serial No. 189,643.

My present invention has reference to a tool for facilitating the insertion and removal of the shackle bolt between the springs and perches of automobiles and like vehicles and has for its object the provision of a tool for this purpose which is of an extremely simple construction, may be cheaply manufactured and marketed, adjustable to compensate for employment upon varying sizes of perches and which affords the operator a leverage sufficient to lift or lower the spring so that the shackle bolt may be positioned or removed with the least amount of physical exertion upon the part of the operator.

To the attainment of the foregoing the improvement consists in the construction, combination and operative association of parts, a satisfactory embodiment of which is disclosed by the accompanying drawings.

In the drawings:

Figure 1 is a front elevation illustrating the manner in which the tool operates upon the front spring of an automobile or like vehicle.

Figure 2 is a similar view showing the tool in operative position on the rear of the vehicle.

Figure 3 is a perspective view of the tool proper.

Figure 4 is a perspective view of a fulcrum member employed.

Figures 5 and 6 illustrate perspective views of the hook members employed.

As disclosed by the drawings my tool contemplates the employment of an elongated metal shank or handle 1, provided with series of transverse notches 2. The handle 1 has one of its ends bent at a right angle, as indicated by the numeral 3 and this end is comparatively short and is threaded. The end 3 is screwed in the socket portion 4 of a forked member 5.

In inserting or removing the shackle bolt on the front of an automobile or like vehicle, the fork 5 is arranged over one of the spring perches 6 and rests upon the upper portion thereof. In this instance I employ a hook best illustrated by Figure 5 of the drawings. One of the rounded ends of the hook is arranged over the handle 1, the second angle end 7 of the hook being offset from the first mentioned rounded end 8 thereof and merging into an upturned lug or finger 9. The portion 7 of the hook is received between the lower leaf of the spring 10. The rounded upper end 8 of the hook is offset with respect to the spring engaging end 7 thereof, so the lever 1 can be conveniently operated at either side of the spring 10. The lever is of sufficient length to permit of the operator obtaining sufficient leverage to either raise or lower the spring 10 without undue physical exertion. By bringing the eye of the hook slightly toward the perch 6 the shackle bolt may be withdrawn by the hand of the operator, the strength of the remaining hand of the operator being amply sufficient to swing the lever 1. In a like manner the lever may be employed for moving the spring toward the perch for the insertion of the shackle bolt.

When the lever is employed for removing the rear spring from the rear perch of the vehicle I make use of a notched plate 11. This plate is arranged to straddle the rear perch 12 and the upper edge of the plate is sharpened, as at 13. The lever is turned reversely with respect to its position when operating on the front spring, so that one of the notches 2 will be received in the sharpened edge 13 of the fulcrum plate 11. In this instance a hook 14 that has a comparatively narrow upper beak 16 is arranged over the lever at its juncture with the angle end 3 thereof and the second and widened rounded end 17 of the hook is arranged over the leaf spring as disclosed by Figure 2 of the drawings. A pressure on the lever 1 in opposite directions is required for the insertion of the shackle bolt and the lowering of the spring after the removal thereof.

The device is of an extremely simple nature and the advantages thereof will be understood and appreciated by those skilled in the art to which such invention relates.

Having described the invention, I claim:

A tool for the purpose set forth, comprising a comparatively long handle member which is notched transversely which notches are designed for the reception of a hook or like element thereon and which handle member has one of its ends bent angularly and threaded and a forked member having a socket end in which the threaded end of the handle is screwed.

In testimony whereof I affix my signature.

WILLIAM A. THWEATT.